April 1, 1952 M. L. ADAMS 2,591,037
IRRIGATION SIGNAL DEVICE
Filed June 11, 1949 2 SHEETS—SHEET 1
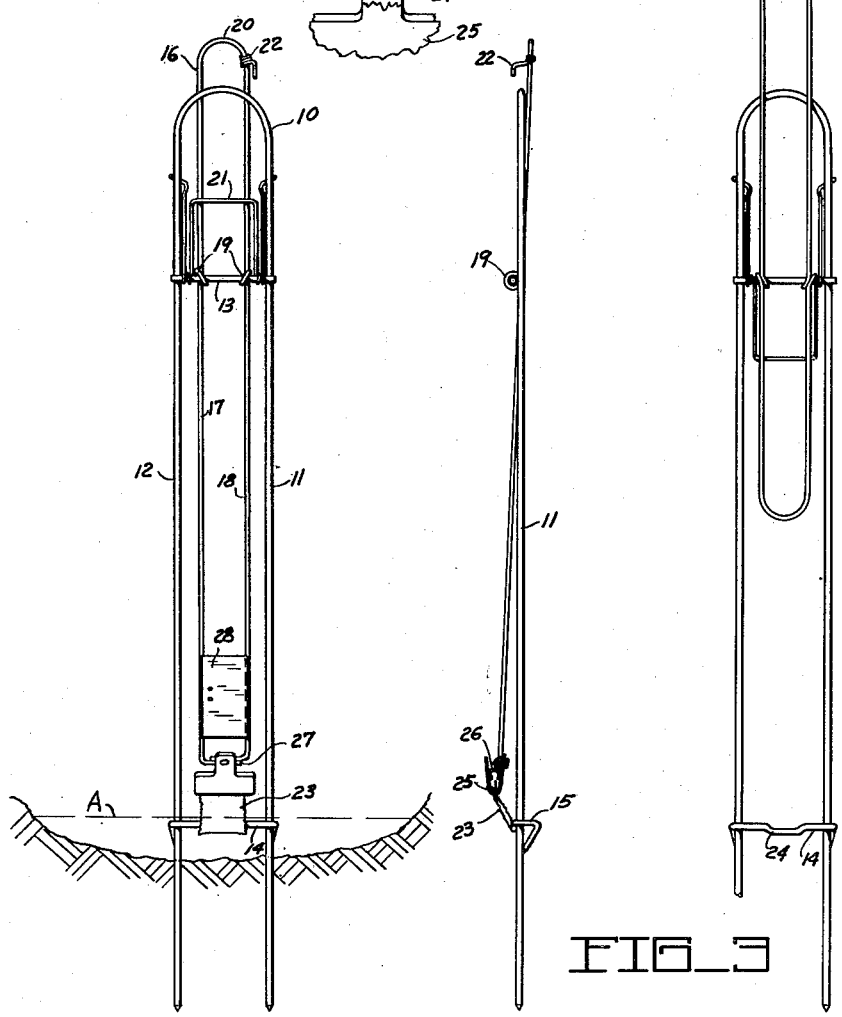
INVENTOR.
MERRILL L. ADAMS
BY
Attorney April 1, 1952 M. L. ADAMS 2,591,037
IRRIGATION SIGNAL DEVICE
Filed June 11, 1949 2 SHEETS—SHEET 2
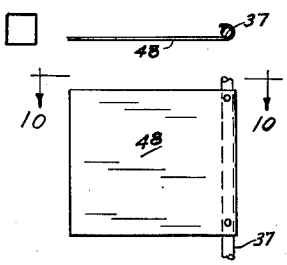
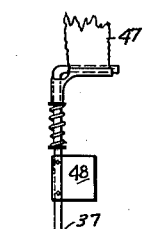
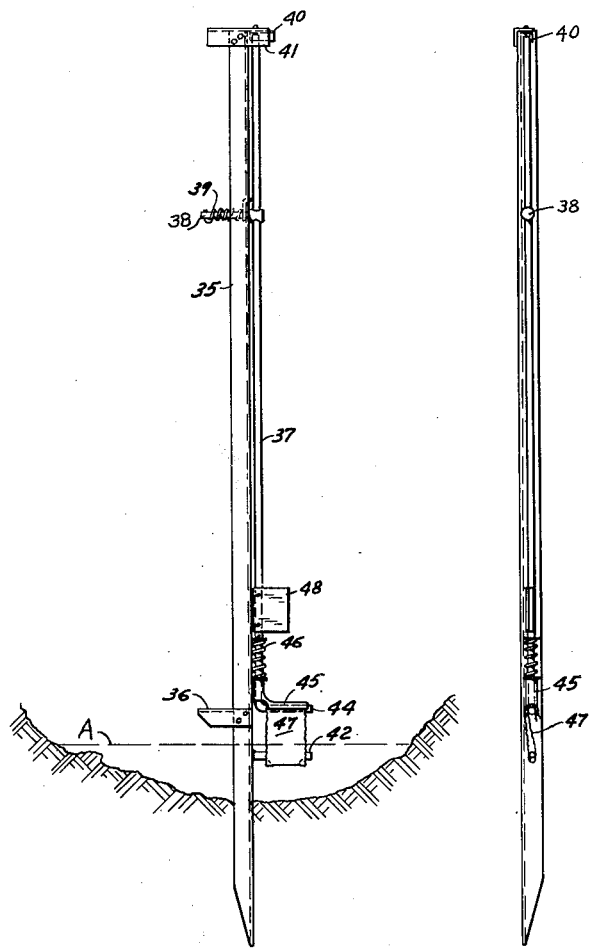
INVENTOR.
MERRILL L. ADAMS
BY *Oswald H. Wilmore*
   *Attorney*

Patented Apr. 1, 1952

2,591,037

UNITED STATES PATENT OFFICE 2,591,037

IRRIGATION SIGNAL DEVICE

Merrill L. Adams, Modesto, Calif.

Application June 11, 1949, Serial No. 98,569

13 Claims. (Cl. 116—114)

This invention relates to an irrigation water signal device for giving a signal in response to the presence of water at a signal station. The signal device is particularly, although not exclusively, intended for use in fields which are irrigated from an irrigation ditch, sluice, flume or other water conduit for giving an indication when water has reached a point remote from the source of admission of the water into the field. For convenience, irrigation ditches will be hereinafter referred to, it being understood that the invention is equally applicable to other forms of water conduit.

In irrigating substantially level land it is common practice to subdivide the land into long, narrow patches by earth embankments extending laterally from the irrigation ditch, sometimes for considerable distances up to several hundred yards. Water is admitted into each patch at a flow control station, e. g., through a sluice gate or valve, until the water has attained a predetermined depth at a point remote from the flow control station, the depth being dependent upon the nature of the crop and the season. It is important to prevent waste of water and possible damage by over-irrigating. It has heretofore been usual to observe the water at the ends of the patches remote from the water flow control stations, and this has either required the services of two men—one to observe the progress of the water in the several patches and the other to shut off the water in response to his partner's signal—or has made it necessary for a single operator to walk back and forth repeatedly, because the progress of the water is generally not the same in the several patches. Even in cases where patches of comparatively short dimensions are irrigated the vegetation often makes it impossible to observe the depth of the water.

Irrigation signal devices have heretofore been proposed. These are in most instances expensive and complicated, or bulky to handle, and have not met with general success. When it is considered that large numbers up to several hundred of such patches are frequently irrigated on the same day, it becomes apparent that such signal devices should be inexpensive to purchase and operate, should be easily maintained in operating condition, and should be light in weight and compact for easy transportation across the field.

Moreover, most of the devices heretofore proposed employed floats for actuating the signal. Aside from the difficulty in maintaining such float-actuated devices in reliable operation despite moisture and mud accumulated in the fields, they are in many instances quite unsuitable for use in irrigating long patches because they function only after the water has risen through a height great enough to raise the float. In long patches of substantially level land the water advances slowly, and continues to flow for a considerable time after the gate or control valve has been shut; the water level, therefore, continues to rise at the signal station for some time after the signal has been transmitted. This often renders such signal devices unsuitable for use in long patches, particularly when only a shallow depth of water is desired, it being then necessary to have a signal which operates soon after the water reaches the signal station, before it has risen to any appreciable height above the ground. When float-actuated signal devices are moved nearer to the flow control station to give an earlier signal the difficulty is not fully overcome because the flow of water beyond the signal device cannot be easily predicted with accuracy and the patch may be over-flooded or under-irrigated at the remote end.

The principal object of this invention is to provide a simple irrigation signal device for giving an indication when water in the field reached any desired level at a remote point, whether such level to be the level of the ground or a higher level; in other words, to provide a signal device that does not depend upon the action of a float.

A further object is to provide an irrigation signal device which can be manufactured and marketed at a low price, thereby making it suitable where large numbers of narrow patches are to be irrigated simultaneously. Another object is to provide an improved signal device which is compact, light in weight, easy and inexpensive to operate and maintain, and reliable in its operation.

A further object is to provide an irrigation signal device which will raise a semaphore to a considerable height so as to be easily recognized despite intervening vegetation. Another object is to provide a signal device which can be recognized in the day or at night.

Still other objects will become apparent from the following description.

Briefly, the irrigation signal device according to the invention comprises: upright base or standard, preferably having one or more spikes adapted to be driven or pushed into the ground; a semaphore or flag arm movably, e. g., pivotally, supported on the standard; means, such as a spring or a weight, for urging the semaphore to move to a signalling position, which normally is a raised position; and a strap having a low wet strength binding the semaphore to the standard against movement to the signalling position. The strap may consist of one or more thicknesses of material and is conveniently attached by providing a strap-engaging bar and a clamp, one on the standard and the other on the semaphore, and looping the strap over the bar, the free ends being fixed in the clamp. It is preferred to mount the clamp on the semaphore, whereby the strap will be raised with it, but the relation between the bar and clamp may be reversed. The strap is made of inexpensive tissue, preferably paper having a low wet strength, such as paper of the type commonly used for newsprint. The device is employed at a selected signal station in the field to be irrigated with the strap at the height at which the presence of water is to be indicated. Soon after the water rises to the level of the strap the latter loses its tensile strength and fails, permitting the semaphore to move to the signalling position.

According to a further feature of the invention, the strap-engaging bar is made of limited length to form a breaker point. The breaker point is preferably, although not necessarily, formed by shaping the strap-engaging bar with a portion offset in a direction away from the clamp and providing a ridge or edge of limited length against which the strap is forced by tension from the clamp. This limited contact area between the breaker point and strap greatly simplifies the replacement of the straps because a strip of paper of any reasonable width equal to or in excess of the length of the breaking point can be used without altering the time required for rupture of the paper after being wetted.

The semaphore may be provided with a luminous coating, such as phosphorescent or luminous paint, or with a light, for giving a visual indication at night.

The invention will be further described with reference to the accompanying drawings forming a part of this specification and showing, by way of example, two preferred embodiments, wherein:

Figs. 1 and 2 are a front and a side elevation respectively, of the signal device in non-signalling position;

Fig. 3 is a front elevation of the device in signalling position;

Fig. 4 is an enlarged fragmentary elevation of the end of the semaphore;

Fig. 5 is a section on line 5—5 of Fig. 4;

Figs. 6 and 7 are front and side elevation views of a modification in non-signalling position;

Fig. 8 is a front elevation view of the modified device in signalling position;

Fig. 9 is an enlarged fragmentary view of the end of the semaphore; and

Fig. 10 is a section on line 10—10 of Fig. 9.

Referring to Figs. 1 to 5, the upright standard 10 is formed from a continuous piece of metal rod or heavy wire bent as an inverted U with parallel legs 11 and 12 which are pointed at the ends to facilitate entry into the ground, and which are interconnected by upper and lower cross braces 13 and 14, respectively, welded thereto. The upper brace 13 functions also as a journal for the semaphore and the lower brace 14 functions also as a strap-engaging bar, as will be described, and has its ends projecting laterally to form a step 15.

The semaphore or flag arm 16 is likewise formed of a continuous piece of metal rod or heavy wire, bent into a U shape, but is slightly shorter and is narrower in width so as to fit between the legs 11 and 12. The parallel sides 17 and 18 of the semaphore have convolutions forming curls or loops 19 disposed with openings in alignment along a transverse axis, through which the upper brace 13 is passed prior to being welded to the standard. The curls 19 are preferably located off center with respect to the length of the semaphore, thereby subdividing it into a shorter section—in the specific embodiment illustrated, the section containing the bend 20—and a longer section extending down almost to the cross brace 14. A light wire spring 21, having several turns about the upper brace 13, is arranged to urge the semaphore to rotate from the non-signalling position shown in Figs. 1 and 2 to the signalling position, shown in Fig. 3, with the longer section raised. To retain the semaphore in its non-signalling position there is preferably provided a latch, such as a slide clamp 22 having a coiled portion encircling the semaphore and a protruding finger adapted to engage the upper bend of the standard.

The semaphore is further retained in non-signalling position by a strap 23 formed of paper or other material having a low wet strength, and arranged in any desired manner to tie the end of the semaphore to the bottom of the standard, preferably to the lower brace shown. Although the invention is not limited to the specific arrangement to be described, it is preferred and was found to be both simple to use and reliable in its operation. According to this preferred arrangement the lower brace 14 has an offset portion 24 bent away from the semaphore, e. g., downwardly, to form a breaker point of a length (measured along the length of the brace) which is the same for all semaphores of the same type. The long end of the semaphore is provided with a clamp of any style, such as a paper clamp shown which has stiff metal jaws 25 pressed together by a resilient sheet of metal 26 secured to inwardly bent ends 27 of the semaphore sides. The paper strap 23 should preferably be somewhat wider than the length of the breaker point; it is looped about the breaker point and its ends are brought together and secured to the semaphore by the paper clamp.

The standard 10 may be emplaced in the ground by guiding it by hand and stepping on the step 15. The standard is fixed at the desired signal station until the breaker point 24 is at the level at which it is desired to indicate the presence of water.

For daytime use no special flag is normally required, because the torn paper strap 23 itself permits observation of the arm. The semaphore may, however, be provided with a plate 28 secured to the sides 17 and 18 by a resilient catch 29. Such plate is particularly useful when the device is to be used at night, and may be painted with luminescent paint or otherwise coated with a fluorescent or phosphorescent material. It may be noted that when a series of such devices is employed in long, narrow adjoining patches it is desirable to employ different colors on the plates 28 or to use straps 23 of different colors. Further, it is evident that any other signal indicator, such as a light, may be fixed to the semaphore.

In using the signal device, the semaphore is first locked by the clamp 22 in non-signalling position, permitting it to be carried conveniently to the signal station. There it is emplaced by forcing the pointed ends of the legs into the ground to the depth necessary to bring the breaker point 24 to the desired level. The strap 23 is then looped about the breaker point and secured to the semaphore by the clamp 25. The clamp 22 is then released. When water A reaches the breaker point 24 the strap absorbs moisture, losing its strength and rupturing, thereby permitting the semaphore to swing about the upper brace 13 to its signalling position with the long section uppermost. The pivotal movement of the semaphore is arrested by engagement thereof with the upper bend of the standard.

The dimensions of the device may obviously be selected as desired. In a typical construction the standard may be 30 in. in height and 3 in. in width, and the breaker point 24 may be a half inch in length. By constructing all of the devices with springs 21 and with breaker points of the same length of the same tension a standard breaking time after the strap is first moistened by the water is established; in this way straps 23 of any convenient width, such as from one to three inches, will break in the same time when wet assuming, of course, that they are made of the same material.

In the modified embodiment illustrated in Figs. 6 to 10, the standard 35 is formed of a single post having angular cross section and a point at the bottom to facilitate entry into the ground. It is provided with a step 36 near the bottom. The semaphore 37 is formed of a single metal rod having a pivot point toward one end thereof at which it is pivotally mounted by a pin 38 near the top of the standard. It is urged to rotate from the non-signalling position shown to a signalling position by a torsion spring 39. A latch 40 is pivotally mounted on a horizontal abutment 41 fixed to the top of the standard and retains the semaphore in non-signalling position.

The standard carries, near the bottom, a lateral bar 42 having a horizontal, downwardly offset portion 43 forming a breaker point which functions as does the breaker point 24 of the previously described embodiment. The semaphore has its longer end bent at right angles to provide a horizontal finger 44 which is juxtaposed to the breaker point when the semaphore is in its non-signalling position. A slide clamp 45 is urged against finger 44 by a compression spring 46. The strap 47 of low wet strength paper, cut or torn to any convenient width which is preferably not less than the length of the breaker point at the point of contact therewith, is looped about the breaker point and has its ends secured to the semaphore by being clamped between the finger 44 and the clamp 45.

The semaphore may optionally be provided with a plate 48, secured at the long end; this may be given a luminous coating as in the case of the plate 28.

The use and operation of this device are the same as for the first embodiment, except that the pivotal movement of the semaphore is arrested in its signalling position by the lateral abutment 41 at the top of the standard. The device is emplaced with the breaker point 43 at or slightly below the level of the water A at which an indication is desired, and the latch 40 is moved to release the semaphore after the strap has been secured.

Numerous variants are possible, both in the details of the construction of the device and in its manner of use. For example, the signal device may be "loaded," i. e., the strap may be attached thereto, prior to emplacement in the ground. Thus, an irrigator, while tending one set of irrigation ditches, would make use of his available time in preparing another set of signal devices by loading them and leaving them in locked or non-signalling positions; these loaded devices would then be located at the lower ends of a new set of ditches and the old set would then be picked up on the return trip. Since the devices are light, a number of them would be carried in one arm and the placement accomplished with the free hand, aided by foot pressure on the step; the clamp would be released after emplacement.

Another variant is to use several signal devices with different color indications, e. g., different colored paper straps, lights or luminous paint, in the same ditch at different locations and/or near each other but set with their breaker points at different elevations. The latter expedient makes it possible to apply the signal device to a commonly used irrigation method in which a fast head of water is used at first until the water reaches the end of the ditch and a slower rate of water is then used to permit the water to percolate for a length of time or to a desired depth. In such an application one color may be used for a starter, indicating that the water has reached the end of the ditch, while another color may be used for the shutdown, indicating that the water has risen to a desired higher level.

I claim as my invention:

1. An irrigation signal device comprising an upright standard adapted to be emplaced in a field to be irrigated; a semaphore movably mounted on the standard having a signalling position and a non-signalling position; means urging the semaphore to signalling position; and a strap of low wet strength material arranged to restrain the semaphore in said non-signalling position, whereby said strap will rupture upon being moistened and thereby permit movement of the semaphore to said signalling position.

2. An irrigation signal device according to claim 1 wherein the lower part of the strap is passed over a breaker point disposed at the level at which the presence of water is to be indicated, said breaker point having a length not greater than the width of the strap the part of the strap in engagement with said breaker point being exposed for immediate wetting thereof by water at the said level.

3. In combination with the signal device of claim 1, a latch for securing the semaphore in non-signalling position.

4. In combination with the signal device of claim 1, a plate on the semaphore having thereon a luminous coating.

5. An irrigation signal device comprising a standard adapted to be emplaced in a field to be irrigated in an upright position and a semaphore movably mounted on the standard having a signalling position and a non-signalling position; means urging the semaphore to a signalling position; a strap-engaging bar and a clamp, one on the semaphore and the other on the standard, located to be in juxtaposition when the semaphore is in its non-signalling position; and a strap of low-wet strength material looped about said bar and having the ends thereof fastened by said clamp for retaining the semaphore in said non-signalling position, whereby said strap will rupture upon being moistened and thereby free the semaphore for movement to its signalling position.

6. An irrigation signal device according to claim 5 wherein the strap-engaging bar has a portion of limited length offset away from said clamp to form a breaker point, the length of said portion being not in excess of the width of said strap.

7. As a subcombination, moisture-responsive restraining means comprising two relatively movable members; means yieldably urging said members apart; a clamp and a strap-engaging bar, one on each of said members; and a strap of low-wet strength material looped about the strap-engaging bar and having its ends fastened by said clamp, said bar engaging the strap for a distance transversely with respect to the strap which is less than the width of the strap whereby said strap will be ruptured at a time after being moistened which is independent of the exact width of the strap, permitting said members to move apart.

8. The subcombination according to claim 7 wherein the strap-engaging bar has a portion of length less than the width of the strap offset away from the clamp, whereby the strap is engaged only by said offset portion.

9. An irrigation signal device comprising an upright standard adapted to be emplaced in a field to be irrigated; a semaphore pivotally mounted on the standard having a signalling position and a non-signalling position; resilient means urging the semaphore to pivot into signalling position; and a strap of low-wet strength material arranged to retain the semaphore in said non-signalling position whereby said strap will rupture upon being moistened and thereby permit movement of the semaphore to said signalling position.

10. An irrigation signal device comprising an upright standard having a pair of legs adapted to be pushed into the ground for emplacing the standard in a field to be irrigated; a semaphore pivotally mounted about an axis transverse to said legs and having a relatively shorter section on one side of said axis and a longer section on the other side of said section; resilient means urging said semaphore to pivot to a position with the longer section uppermost; a strap-engaging bar and a clamp, one on the standard near the bottom thereof and the other on the semaphore near the end of the longer section thereof and a strap of low-wet strength material arranged in a loop about the strap-engaging bar and having its ends fastened by said clamp for retaining the longer section of the semaphore down in non-signalling position, whereby said strap will rupture upon being moistened to permit the semaphore to pivot to its signalling position with the longer section thereof raised.

11. An irrigation signal device comprising an upright standard formed of a metal rod bent as an inverted U and providing a pair of legs adapted to be inserted into the ground for emplacing the standard in a field to be irrigated; a pair of cross braces connecting said legs at an upper level and at a lower level; a semaphore formed of a metal rod bent into a U-shape having a width less than the width of the standard and having curls nearer one end thereof than the other, providing a long section and a short section on opposite sides of the curls, said curls encircling the upper of said cross braces for pivotal movement thereon; a spring urging the semaphore to pivot about said upper cross brace to raise the longer section and bring it into engagement with the upper, rounded portion of the standard; a clamp at the end of the long section of the semaphore; a clamp at the end of the long section of the semaphore; and a strap of low-wet strength material looped about the lower of said cross braces and having the ends thereof secured by said clamp for retaining the long section of the semaphore in a depressed non-signalling position, whereby said strap will rupture upon being moistened to permit the semaphore to pivot to its signalling position with the long section thereof raised.

12. The irrigation signal device according to claim 11 wherein the lower cross brace has a portion offset in a direction away from said clamp to provide a breaker point of limited length.

13. An irrigation signal device comprising an upright standard formed of a pole pointed to facilitate insertion into the ground for emplacing the standard in a field to be irrigated; a semaphore pivotally mounted on the standard about a horizontal pivot axis near the top of the standard and disposed nearer one end of the semaphore than the other, providing a long section and a short section on opposite sides of the pivot axis; a spring urging the semaphore to pivot about said pivot axis to raise the long section; a clamp at the end of the long section of the semaphore; a strap-engaging bar extending laterally from the standard near the bottom located to be in juxtaposition with said clamp when the semaphore is in non-signalling position with the long section depressed; and a strap of low-wet strength material looped over said strap-engaging bar and having the ends thereof secured by said clamp for retaining the semaphore in said non-signalling position, whereby strap will rupture upon being moistened to permit the semaphore to pivot to its signalling position with the long section raised.

MERRILL L. ADAMS.

REFERENCES CITED

The following references are of record in the file of this patent:

UNITED STATES PATENTS

| Number | Name | Date |
|---|---|---|
| 380,899 | Jones | Apr. 10, 1888 |
| 1,153,314 | Keller | Sept. 14, 1915 |
| 1,248,633 | Doak | Dec. 4, 1917 |
| 1,451,056 | Schindler | Apr. 10, 1923 |
| 1,711,975 | Sullivan | May 7, 1929 |
| 2,082,763 | Garrison | June 1, 1937 |